United States Patent
Liu et al.

(10) Patent No.: US 11,146,794 B2
(45) Date of Patent: Oct. 12, 2021

(54) METHOD OF SYSTEM FOR VIDEO CODING USING INTRA BLOCK COPY MODE

(71) Applicant: MEDIATEK INC., Hsin-Chu (TW)

(72) Inventors: Shan Liu, San Jose, CA (US); Xiaozhong Xu, State College, PA (US)

(73) Assignee: MEDIATEK INC., Hsin-Chu (TW)

( * ) Notice: Subject to any disclaimer, the term of this patent is extended or adjusted under 35 U.S.C. 154(b) by 710 days.

(21) Appl. No.: 15/746,892

(22) PCT Filed: Jul. 26, 2016

(86) PCT No.: PCT/CN2016/091674
§ 371 (c)(1),
(2) Date: Jan. 23, 2018

(87) PCT Pub. No.: WO2017/016468
PCT Pub. Date: Feb. 2, 2017

(65) Prior Publication Data
US 2020/0084454 A1 Mar. 12, 2020

Related U.S. Application Data

(60) Provisional application No. 62/245,372, filed on Oct. 23, 2015, provisional application No. 62/197,197, filed on Jul. 27, 2015.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/172* (2014.11);
(Continued)

(58) Field of Classification Search
None
See application file for complete search history.

(56) References Cited

U.S. PATENT DOCUMENTS

2016/0261874 A1* 9/2016 Chong ................. H04N 19/117
2016/0360234 A1* 12/2016 Tourapis ............. H04N 19/156

FOREIGN PATENT DOCUMENTS

AU          2013228045 A1    4/2015
KR          20140076508 A    6/2014
(Continued)

OTHER PUBLICATIONS

Rapaka, et al.; "CE2: Test 5 on intra block copy constraints on prediction"; Joint Collaborative Team on Video Coding (JCT-VC) of ITU-T 16 WP 3 and ISO/IEC JTC 1/SC 29/WG 11 21st Meeting: Warsaw, PL, Jun. 19-26, 2015; pp. 1-2.
(Continued)

*Primary Examiner* — James M Anderson, II
(74) *Attorney, Agent, or Firm* — McClure, Qualey & Rodack, LLP (57) ABSTRACT

A method and system for video system using coding modes including an Inter prediction mode and an Intra Block Copy (IntraBC) mode are disclosed. A syntax element in a bitstream is determined to indicate whether two versions of a reconstructed current image unit are needed. If two versions of the reconstructed current image unit are needed, a loop-filtered version of the reconstructed current image unit and a non-loop-filter version of the reconstructed current image unit are allowed to be stored and used as reference data. Otherwise, only one version of the reconstructed current image unit is stored as the reference data. According to another method, bi-prediction mode is converted to uni-prediction mode for a certain prediction mode, where the bandwidth exceeds the existing worst case.

11 Claims, 3 Drawing Sheets

(51) Int. Cl.
*H04N 19/172* (2014.01)
*H04N 19/174* (2014.01)
*H04N 19/176* (2014.01)
*H04N 19/186* (2014.01)
*H04N 19/52* (2014.01)
*H04N 19/70* (2014.01)
*H04N 19/82* (2014.01)

(52) U.S. Cl.
CPC ......... *H04N 19/174* (2014.11); *H04N 19/176* (2014.11); *H04N 19/186* (2014.11); *H04N 19/52* (2014.11); *H04N 19/70* (2014.11); *H04N 19/82* (2014.11)

(56) References Cited

FOREIGN PATENT DOCUMENTS

| WO | 2015/031806 A1 | 3/2015 |
| WO | 2015/070801 A1 | 5/2015 |
| WO | 2015/078304 A1 | 6/2015 |

OTHER PUBLICATIONS

Joshi, et al.; "High Efficiency Video Coding (HEVC) Screen Content Coding: Draft 4"; Joint Collaborative Team on Video Coding (JCT-VC) of ITU-T SG 16 WP 3 and ISO/IEC JTC 1/SC 29/WG 11 21st Meeting: Warsaw, PL, Jun. 19-26, Jun. 2015; pp. 1-665.

Liu, et al.; "On operation of DPB in screen content coding"; Joint Collaborative Team on Video Coding (JCT-VC) of ITU-T 16 WP 3 and ISO/IEC JTC 1/SC 29/WG 11 21st Meeting: Warsaw, PL, Jun. 19-26, 2015; pp. 1-4.

Rapaka, K., et al.; "CE2: Test 5 on intra block copy constraints on prediction;" Joint Collaborative Team on Video coding (JCT-VC) of ITU-T SG 16 WP 3 and ISO/IEC JTC 1/SC 29/WG 11; Jun. 2015; pp. 1-2.

Liu, C., et al.; "On operation of DPB in Screen Content Coding;" Joint Collaborative Team on Video Coding (JCT-VC) of ITU-T SG 16 WP 3 and ISO/IEC JTC 1/SC 29/WG 11; Jun. 2015; pp. 1-4.

Joshi, R., et al.; "HEVC Screen Content Coding Draft Text 3;" Joint Collaborative Team on Video Coding (JCT-VC) of ITU-T SG 16 WP 3 and ISO/IEC JTC 1/SC 29/WG 11; Feb. 2015; pp. 1-559.

International Search Report dated Oct. 20, 2016, issued in application No. PCT/CN2016/091674.

Joshi, R., et al.; "High Efficiency Video Coding (HEVC) Screen Content Coding: Draft 4;" Joint Collaborative Team on Video Coding (JCT-VC) of ITU-T SG 16 WP 3 and ISO/IEC JTC 1/SC 29/WG 11; 21st Meeting: Warsaw, PL; Jun. 2015; pp. 1-663.

Xu, X., et al.; "On intra block copy signalling and constraints;" Joint Collaborative Team on Video Coding (JCT-VC) of ITU-T SG 16 WP 3 and ISO/IEC JTC 1/SC 29/WG 11; 22nd Meeting: Geneva, CH; Oct. 2015; pp. 1-5.

Xu, X., et al.; "DPB considerations when current picture is a reference picture;" Joint Collaborative Team on Video Coding (JCT-VC) of ITU-T SG 16 WP 3 and ISO/IEC JTC 1/SC 29/WG 11; 22nd Meeting: Geneva, CH; Oct. 2015; pp. 1-5.

\* cited by examiner

METHOD OF SYSTEM FOR VIDEO CODING USING INTRA BLOCK COPY MODE

CROSS REFERENCE TO RELATED APPLICATIONS

The present invention claims priority to U.S. Provisional Patent Application, Ser. No. 62/197,197, filed on Jul. 27, 2015 and U.S. Provisional Patent Application, Ser. No. 62/245,372, filed on Oct. 23, 2015. The U.S. Provisional Patent Applications are hereby incorporated by reference in their entireties.

TECHNICAL FIELD

The present invention relates to video coding using coding modes including Intra-block copy (IntraBC) mode and Inter prediction mode. In particular, the present invention relates to techniques to reduce picture buffer requirement and to overcome the bandwidth issue when a bandwidth-intensive prediction mode is used.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. HEVC also supports slice structure, where a picture is partitioned into slices and each slice may use its own coding parameters or configurations.

Along with the High Efficiency Video Coding (HEVC) standard development, the development of extensions of HEVC has also started. The HEVC extensions include range extensions (RExt) which target at non-4:2:0 colour formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency.

Intra Block Copy Prediction

Figure 1:
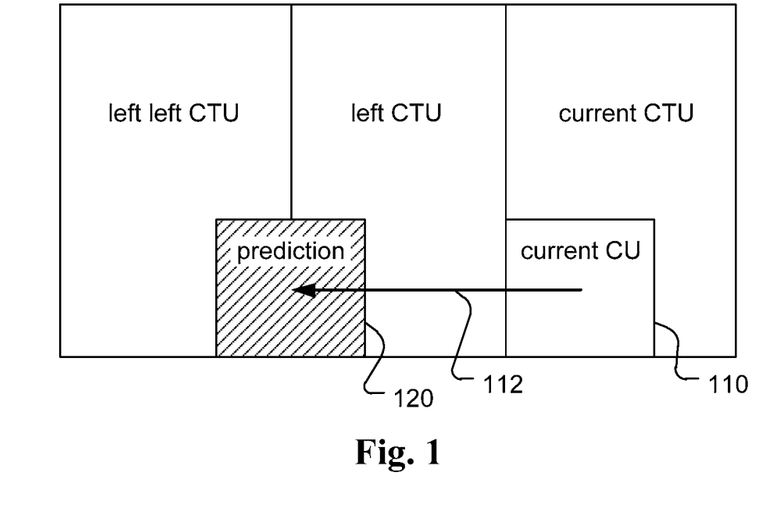
FIG. 1 illustrates an example of Intra Block Copy (IntraBC) mode, where a current block is predicted by a reference block in the current picture.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighbouring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra Block Copy mode. The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transforms.

In JCTVC-M0350, the Intra MC is different from the motion compensation used for Inter prediction in at least the following areas:
- MVs are restricted to be 1-D for Intra MC (i.e., either horizontal or vertical) while Inter prediction uses 2-D motion estimation.
- Binarization is fixed length for Intra MC while Inter prediction uses exponential-Golomb.
- Intra MC introduces a new syntax element to signal whether the MV is horizontal or vertical.

Based on JCTVC-M0350, some modifications are disclosed by Pang, et al. in *Non-RCE3: Intra Motion Compensation with 2-D Mvs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two BV coding methods are disclosed:
Method 1—Block vector prediction. The left or above BV is selected as the BV predictor and the resulting motion vector difference (BVD) is coded. A flag is used to indicate whether the BVD is zero. When BVD is not zero, exponential-Golomb codes of the 3rd order are used to code the remaining absolute level of the BVD. Another flag is used to code the sign.

Method 2: No block vector prediction. The BV is coded using the exponential-Golomb codes that are used for BVD in HEVC.

Another difference disclosed in JCTVC-N0256 is that the 2-D IntraBC is further combined with the pipeline friendly approach:
1. No interpolation filters are used.
2. BV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D IntraBC, the removal of interpolation filters, and the search area constraint to the current CTU and the left CTU have been adopted in a new version of draft HEVC RExt standard.

IntraBC in Existing SCC Draft Standard (SCM)

In JCTVC-T0227 (Pang, et al., *Non-CE2 Test1: Intra block copy and inter signalling unification*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0227), the IntraBC mode is unified with Inter coding mode. In other words, the current picture is treated as a reference picture and inserted into one or both reference picture lists (i.e., lists L0 and L1). Block vector prediction and coding are treated in the same way as Inter motion vector prediction and coding. This unification simplifies the codec design.

Adaptive Motion Resolution

In JCTVC-50085 (Li, et al., *Adaptive motion vector resolution for screen content*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-50085), a flag "use_integer_mv_flag" is used for each slice to indicate the resolution of MV in the slice. If this flag is 1, all the decoded motion vectors in this slice are represented using integer-pel resolution; otherwise, the motion vectors are represented using quarter-pel resolution, as specified in the HEVC standard.

Memory Bandwidth Consideration in Current SCC Draft Standard (SCM)

When reconstructing a block, the reference block needs to be used for prediction. If the motion vector points to a fractional position, more pixels surrounding the reference block are also required for interpolation purpose. When retrieving a reference block and its surrounding pixels when necessary from external memory, the data fetch will be conducted in bulk depending on the memory pattern used. For example, if the memory pattern used is 4×4 sample block, the minimum unit for access data will be 4×4 pixels even if only one pixel is needed. Therefore, more data than the direct related pixels will have to be retrieved and sent to on-chip memory/buffer for further processing. These data are all involved in memory bandwidth consumption. In HEVC, the worst case memory bandwidth consumption is in 8×8 bi-prediction mode with both motion vectors having fractional-pel MVs. When IntraBC mode is used, the unfiltered version of current picture needs to be stored in the external memory in addition to the filtered version of current picture for Inter prediction mode. This is considered as an extra cost to HEVC.

In JCTVC-U0078 (Rapaka, et al., CE2: Test 5 on intra block copy constraints on prediction, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U0078), some constraints are imposed on the 8×8 bi-prediction mode usage when IntraBC is used. For example, the use of 8×8 bi-prediction mode is disabled when the SPS (sequence Parameter Set) flag for IntraBC is on and slice header flag use_integer_mv_flag (indicating the resolution of MV in the slice) is off.

Decoded Picture Buffer in Current SCC Draft Standard (SCM)

In HEVC, all the reference pictures are stored in a buffer referred as decoded picture buffer (DPB). This is done by each time when decoding a picture, the current decoded picture after the loop filtering operation is put into DPB (referred as filtered version of current decoded picture). For IntraBC, its reference picture is the current decoded picture prior to the loop filter (referred as unfiltered version of current decoded picture), which is an extra picture to be stored in DPB compared to HEVC version 1. In JCTVC-U0181 (Xu, et al., *On storage of filtered and unfiltered current decoded pictures*, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U0181), both the filtered and unfiltered versions of the current decoded picture are put into DPB for picture buffer management. The unfiltered version of current picture will be discarded after the completion of decoding the current picture and the storage buffer for this picture will be released.

The case that the two versions of current decoded picture are identical is considered. This occurs when no loop filters (deblocking or SAO) are used for the current picture. In the current HEVC SCC working draft as described in JCTVC-U1005 (Joshi, et al., *High Efficiency Video Coding (HEVC) Screen Content Coding: Draft* 3, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U1005), a variable referred as TwoVersionsOfCurrDecPicFlag is used to identify whether the current picture is used as a reference picture. If so, there may be two different versions of the current picture due to the use of loop filters in the picture. The DPB management specified in JCTVC-U1005 is summarized as follows:

1) Current decoded picture after the invocation of loop filter is stored in DPB. This picture, upon completion of decoding current picture, is marked as "used for short-term reference". When the decoding is completed, this picture is stored in DPB for future usage.
2) When TwoVersionsOfCurrDecPicFlag flag is equal to 1, current decoded picture before the invocation of loop filter is stored in DPB, in a separate buffer. This picture is marked as "used for long-term reference" and is used for IntraBC compensation. When the decoding is completed, this picture is removed from DPB.

With the changes in decoded picture buffer management when current picture is a reference picture, some constraints need to be imposed to make sure that the function of decoded picture buffer management works properly.

This invention discloses methods to solve issues the above mentioned issues.

SUMMARY

A method and system for video system using coding modes including an Inter prediction mode and an Intra Block Copy (IntraBC) mode are disclosed. A variable in a bitstream is determined to indicate whether two versions of a reconstructed current image unit are needed. If the variable indicates that two versions of the reconstructed current image unit are needed, a loop-filtered version of the reconstructed current image unit and a non-loop-filter version of the reconstructed current image unit are allowed to be stored and used as reference data. If the variable indicates that two versions of the reconstructed current image unit are not needed, storing only one version of the reconstructed current image unit as the reference data. The loop-filtered version of the reconstructed current image unit corresponds to deblocking-filtered, SAO-filtered (Sample Adaptive Offset filtered) or both deblocking-filtered and SAO-filtered versions of the reconstructed current image unit.

The reconstructed current image unit may correspond to a reconstructed current picture. The variable can be determined based on one or more syntax elements in the picture level of the bitstream and wherein said one or more syntax elements are selected from a group of syntax elements comprising a first syntax element indicating whether the IntraBC mode is enabled for a current picture, a second syntax element indicating whether SAO (Sample Adaptive Offset) is enabled, a third syntax element indicating whether deblocking-filter is disabled, and a fourth syntax element indicating whether deblocking-filter-override is enabled. For example, the variable is determined to allow two versions of the reconstructed current image unit if the first syntax element indicates that the IntraBC mode is enabled for a current picture and any of following three conditions is true, where the three conditions correspond to the second syntax element indicates that the SAO is enabled, the third syntax element indicates that the deblocking-filter is disabled, and the fourth syntax element indicates that the deblocking-filter-override is enabled.

In another embodiment, the reconstructed current image unit corresponds to a reconstructed current slice. The variable can be determined based on one or more syntax elements in a picture level, the slice level, or both the picture level and the slice level of the bitstream. The one or more syntax elements can be selected from a group of syntax elements comprising a first syntax element in the picture level of the bitstream indicating whether the IntraBC mode is enabled for a current picture, a second syntax element in the slice level indicating whether luma SAO is enabled for a current luma slice, a third syntax element in the slice level indicating whether chroma SAO is enabled for a current chroma slice, and a fourth syntax element in the slice level indicating whether deblocking-filter is disabled for a current slice. For example, the variable can be determined to allow two versions of the reconstructed current image unit if the first syntax element in the picture level of the bitstream indicates that the IntraBC mode is enabled for the current picture, the second syntax element in the slice level indicates that the luma SAO is enabled for the current luma slice, the third syntax element in the slice level indicates that the chroma SAO is enabled for the current chroma slice, and the fourth syntax element in the slice level indicates that the deblocking-filter is disabled for the current slice.

Another method and system for video system using coding modes including an Inter prediction mode and an Intra Block Copy (IntraBC) mode are disclosed to overcome high bandwidth issue for some prediction modes. The method determines whether a bandwidth-intensive prediction mode is allowed. If the bandwidth-intensive prediction mode is not allowed, the method further determines whether a high-bandwidth bi-prediction mode is used. If the high-bandwidth bi-prediction mode is used, the high-bandwidth bi-prediction mode is converted into a uni-prediction mode to reduce the required bandwidth.

The bandwidth-intensive prediction mode may correspond to an 8×8 bi-prediction mode. The high-bandwidth bi-prediction mode can be converted into the uni-prediction mode by using motion information only from list 0. In one example, the high-bandwidth bi-prediction mode is converted into the uni-prediction mode when the following conditions are true: a current block in a current picture is coded by the 8×8 bi-prediction mode, two versions of the current picture are enabled, motion vectors of the current block coded by the 8×8 bi-prediction mode have no integer value, and the motion vectors of the current block coded by the 8×8 bi-prediction mode are not the same.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the use of Intra Block Copy mode may cause additional storage requirement for reference pictures and additional memory bandwidth. The present invention discloses various methods to reduce the additional storage requirement for reference pictures and/or additional memory bandwidth.

Signalling the Usage of IntraBC Mode

One method according to the present invention removes the constraints from using some particular prediction modes when IntraBC is used and if there is no difference between the unfiltered version and the filtered version of the current picture.

In order to indicate whether the IntraBC mode is used, two variables are signalled to indicate whether the current picture is in the active reference picture list (i.e., list 0 or list 1) according to the first embodiment of this method. For example, the two variables can be named as CurrPicInList0Flag and CurrPicInList1Flag for list 0 and list 1 respectively. An exemplary process to derive the two variable is shown as follows, where the reference pictures in list 0 and list 1 are checked to determine if any reference picture is the current picture:

TABLE 1

CurrPicInList0Flag = 0
CurrPicInList1Flag = 0
for( rIdx = 0; rIdx <= num_ref_idx_l0_active_minus1; rIdx++)
    if ( RefPicList0[ rIdx ] == currPic)
        CurrPicInList0Flag = 1
for( rIdx = 0; rIdx <= num_ref_idx_l1_active_minus1; rIdx++)
    if ( RefPicList1[ rIdx ] == currPic)
        CurrPicInList1Flag = 1

In the second embodiment of this method, a variable TwoVersCurrDecPicFlag is used to determine if maintaining two versions of the reconstructed current picture is necessary. The two versions comprise the loop-filtered version and the non-loop-filter version, where the loop-filtered version corresponds to deblocking-filtered, SAO-filtered (Sample Adaptive Offset filtered) or both deblocking-filtered and SAO-filtered version of the reconstructed current image unit. For example, the two versions of the current picture are required if they are different. Whether maintaining two versions of the current picture is necessary can be derived by checking the use of loop filters in the current picture. If no loop filters are used, there is no difference between the two versions. An exemplary derivation process is shown in table 2, where the syntax element, pps_curr_pic_as_ref_enabled_flag is a picture level IntraBC flag to indicate whether IntraBC is enabled for the picture. The syntax element sample_adaptive_offset_enabled_flag is for indicating whether SAO (Sample Adaptive Offset) is enabled, the syntax element pps_deblocking_filter_disabled_flag is a picture level flag to indicate whether deblocking-filter is disabled, and the syntax element deblocking_filter_override_enabled_flag is for indicating whether deblocking-filter-override is enabled. However, the flag may also be a sequence level flag.

TABLE 2

TwoVersCurrDecPicFlag = pps_curr_pic_as_ref_enabled_flag &&
( sample_adaptive_offset_enabled_flag | |
!pps_deblocking_filter_disabled_flag | |
deblocking_filter_override_enabled_flag )

In the third embodiment of this method, a variable TwoVersCurrDecSliceFlag is used to determine if maintaining two versions of the current picture is necessary. For example, the two versions of the current picture are required if they are different. Whether maintaining two versions of the current picture is necessary can be derived by checking the use of loop filters in the current picture. If no loop filters are used, there is no difference between the two versions. An exemplary derivation process is shown in Table 3, where the syntax element, pps_curr_pic_as_ref_enabled_flag is a picture level IntraBC flag to indicate whether IntraBC is enabled for the picture. The flag can also be replaced by a slice or sequence level flag for IntraBC usage. The syntax element, slice_sao_luma_flag is a slice level flag to indicate whether luma SAO (Sample Adaptive Offset) is enabled for a current luma slice. The syntax element, slice_sao_chroma_flag is a slice level flag to indicate whether chroma SAO is enabled for a current chroma slice. The syntax element, slice_deblocking_filter_disabled_flag is a slice level flag to indicate whether deblocking-filter is disabled for a current slice.

TABLE 3

TwoVersCurrDecSliceFlag = pps_curr_pic_as_ref_enabled_flag &&
(slice_sao_luma_flag | | slice_sao_chroma_flag | |
! slice_deblocking_filter_disabled_flag )

Another aspect of the present invention determines the conditions of disabling the use of memory bandwidth intensive modes. In particular, the 8×8 bi-prediction mode is considered as one such mode.

In the first example, the signalling of IntraBC usage is in a picture level or slice level. Each picture or slice can determine whether to use IntraBC or not. When IntraBC is not used for a picture or slice, there is no need to constrain the use of the 8×8 bi-prediction mode for this picture or slice. When IntraBC is enabled for current picture or slice and, however, all motion vectors (including block vectors) in the current picture or slice use integer resolution, there is no need to constrain the use of 8×8 bi-prediction mode for this picture or slice. The integer resolution of motion vectors (including block vectors) in the current picture or slice can be indicated by the syntax element use_integer_mv_flag equal to 1.

One exemplary decision of the conditions of disabling the use of memory bandwidth intensive modes is shown as follows, where syntax element inter_pred_idc equal to 2 indicates bi-prediction mode and nPbW and nPbH represent the width and height of the prediction unit (PU) respectively:

If the syntax element pps_curr_pic_as_ref_enabled_flag is equal to 1 and use_integer_mv_flag is equal to 0, it is required that at least one of the following for a decoded block is not true:
inter_pred_idc[x0][y0] is equal to 2,
nPbW is equal to 8,
nPbH is equal to 8.

In the second example, the signalling of IntraBC usage is in a picture level, slice header or sequence level. When the current picture is neither in active reference picture list 0 nor in active reference picture list 1, the IntraBC mode will not be used for the slices in the picture. Therefore, there is no need to constrain the use of 8×8 bi-prediction mode in this picture.

One exemplary decision of the conditions of disabling the use of memory bandwidth intensive mode is shown as follows:

If the syntax element use_integer_mv_flag is equal to 0, and either CurrPicInList0Flag or CurrPicInList1Flag is equal to 1, it is required that at least one of the following for a decoded block is not true:
inter_pred_idc[x0][y0] is equal to 2,
nPbW is equal to 8,
nPbH is equal to 8.

In the third example, the filtering operations are measured at picture level. In this case, when the deblocking filter and SAO filter are disabled for the entire picture, there is no difference between the filtered and unfiltered current picture. Therefore, there is no need to write unfiltered current picture to memory separately since the unfiltered current picture is the same as the filtered current picture. Accordingly, there is no need to constrain the use of 8×8 bi-prediction mode in this picture.

One exemplary decision of the conditions of disabling the use of memory bandwidth intensive mode is shown as follows:

If the syntax element use_integer_mv_flag is equal to 0, and TwoVersCurrDecPicFlag is equal to 1, it is required that at least one of the following for a decoded block is not true:
inter_pred_idc[x0][y0] is equal to 2,
nPbW is equal to 8,
nPbH is equal to 8.

In the fourth example, the filtering operations are measured at the slice level. In this case, when the deblocking filter and SAO filter are disabled for the entire slice, there is no difference between filtered and unfiltered current slice. Therefore, there is no need to write unfiltered current slice to memory separately since the unfiltered current picture is the same as the filtered current picture. Accordingly, there is no need to constrain the use of 8×8 bi-prediction mode in this slice.

One exemplary decision of the conditions of disabling the use of memory bandwidth intensive mode is shown as follows:

If the syntax element use_integer_mv_flag is equal to 0 and TwoVersCurrDecSliceFlag is equal to 1, it is required that at least one of the following for a decoded block is not true:
inter_pred_idc[x0][y0] is equal to 2,
nPbW is equal to 8,
nPbH is equal to 8.

In all the above examples, the condition of "use_integer_mv_flag is equal to 0" can be removed. That means, with other conditions, the 8×8 bi-prediction mode cannot be used regardless of the resolution of motion vector in the slice.

In all the above examples, the disabled high-bandwidth bi-prediction mode (i.e., the 8×8 bi-prediction mode) can be replaced by other memory bandwidth intensive modes, such as 8×4 or 4×8 uni-prediction mode, AMP (asymmetric motion partition) modes, etc. Alternatively, if the variable TwoVersCurrDecPicFlag or TwoVersCurrDecSliceFlag indicates that two versions of the reconstructed current image unit are needed, the high-bandwidth bi-prediction mode (e.g., the 8×8 bi-prediction mode) is converted into a uni-prediction mode by only using motion information only from list 0.

Constraint on Prediction Mode Usage when Current Picture is a Reference Picture

According to another method, when data requirement of a certain prediction mode (referred as the bandwidth-intensive prediction mode in this disclosure) exceeds the existing worst case, this prediction mode is prohibited from being used. For example, bi-directional prediction (or bi-prediction) is a candidate of such a prediction mode. This is specifically true when both of the motion vectors for the bi-prediction mode are not integer values and the prediction sample blocks pointed by these two MVs are different. Also it is true when there is a need to write/store the reconstructed samples in the current picture prior to the loop filter process, in addition to the writing/storage of reconstruction samples in the current picture after loop filter process for IntraBC. When all above conditions are met, the decoded bi-prediction mode is converted into a uni-prediction mode according to this method. For example, this can be achieved by using the motion information only from its first list and dropping the motion information from its second list (i.e., keeping L0 but dropping L1). In this way, the data access requirement is reduced. In HEVC, the bi-prediction mode with 8×8 luma block size is considered to be such a prediction mode with most intensive data access requirement.

In one embodiment, the conversion (i.e., from 8×8 bi-prediction mode into 8×8 uni-prediction mode) is done in the decoding process for "Derivation process for motion vector components and reference indices" as specified in 8.5.3.2 of JCTVC-U1005, after the Inter coded MV is derived and stored. Exemplary derivation for two variables are shown as follows, where variable EightByEightBiPredHasNoIntegerMv indicates whether the 8×8 bi-prediction block has no integer MVs and variable EightByEightBiPredNotIdenticalMv indicates whether the MVs of the 8×8 bi-prediction block are not identical:

EightByEightBiPredHasNoIntegerMv=!((mvL0 & 0x3==0)||(mvL1 & 0x3==0)), and
EightByEightBiPredNotIdenticalMv=!((mvL0==mvL1) && (DiffPicOrderCnt(RefPicList0[refIdxL0], RefPicList1[refIdxL1])==0)).

In one embodiment, a set of conditions can be checked to determine whether to convert the bi-prediction to uni-prediction. For example, if the current block is coded by the 8×8 bi-prediction mode, two versions of the current picture are enabled, the 8×8 bi-prediction block has no integer value and motion vectors of the 8×8 bi-prediction coded current block are not the same, bi-prediction can be converted to uni-prediction. Accordingly, when all of the following conditions are true, bi-prediction can be converted to uni-prediction:

predFlagL0 is equal to 1,
predFlagL1 is equal to 1,
nPbSw is equal to 8,
nPbSh is equal to 8,
TwoVersionsOfCurrDecPicFlag is equal to 1,
EightByEightBiPredHasNoIntegerMv equal to 1, and
EightByEightBiPredNotIdenticalMv is equal to 1.

In the above conditions, predFlagL0 and predFlagL1 are the prediction list utilization flags for list 0 and list 1 respectively. When the flag is equal to 1, it indicates the corresponding prediction list is used.

The conversion from bi-prediction to uni-prediction can be done by setting refIdxL1=−1 and predFlagL1=0. In other words, only the motion information from list 0 will be used and the motion information from list 1 is not used.

In another embodiment, when all these above conditions are met, the bi-prediction mode is not allowed and corresponding syntax shall not appear in the bitstream. In HEVC, the bi-prediction mode with 8×8 luma block size is considered to be such a prediction mode with most intensive data access requirement.

In one embodiment, the constraint by disallowing the use of 8×8 bi-prediction can be determined based on variable EightByEightBiPredHasNoIntegerMv and variable EightByEightBiPredNotIdenticalMv as follows:

EightByEightBiPredHasNoIntegerMv=!((mvL0 & 0x3==0)||(mwL1 & 0x 3==0)), and
EightByEightBiPredNotIdenticalMv=!((mvL0==mvL1) && (DiffPicOrderCnt(RefPicList0[refIdxL0], RefPicList1[refIdxL1])==0)).

In one embodiment, it is a requirement for the bitstream conformance that at least one of the following conditions is not true:

predFlagL0 is equal to 1,
predFlagL1 is equal to 1,
nPbSw is equal to 8,
nPbSh is equal to 8,
TwoVersionsOfCurrDecPicFlag is equal to 1,
EightByEightBiPredHasNoIntegerMv equal to 1, or
EightByEightBiPredNotIdenticalMv is equal to 1.

For the above conditions, when any of them is not true, it implies that the worst bandwidth situation is not occurring for the current block. For example, if predFlagL0 is not equal to 1, list 0 is not used. This implies that bi-prediction is not used. If nPbSw is not equal to 8, it implies that the block is not 8×8.

Figure 2:
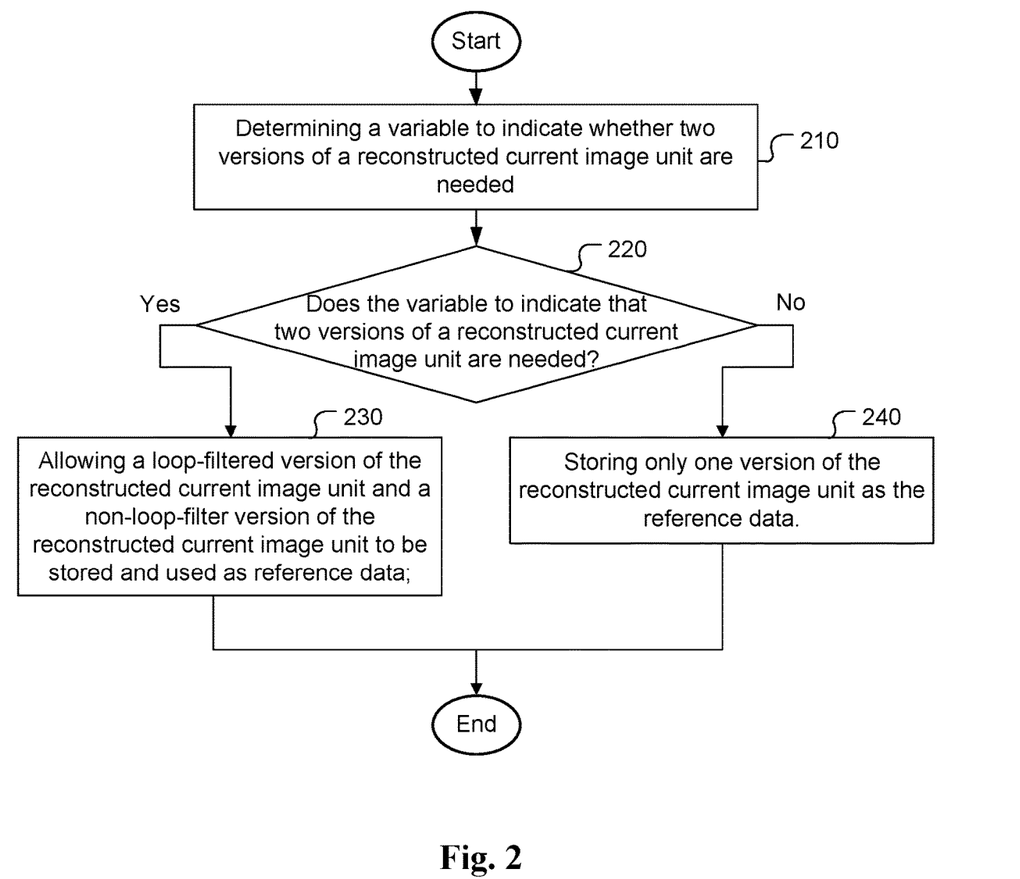
FIG. 2 illustrates a flowchart of an exemplary coding system using coding modes including IntraBC mode (Intra-block copy mode) and Inter prediction mode according to an embodiment of the present invention, where a syntax element is used to indicate whether two versions of the reconstructed current image unit are needed.

FIG. 2 illustrates a flowchart of an exemplary coding system using coding modes including IntraBC mode (Intrablock copy mode) and Inter prediction mode according to an embodiment of the present invention, where one or more syntax elements are used to indicate whether two versions of the reconstructed current image unit are needed. The system determines a variable in a bitstream to indicate whether two versions of a reconstructed current image unit are needed as shown in step 210, in which the variable is determined based on one or more syntax elements. The variable is checked in step 220 to determine whether two versions of the reconstructed current image unit are needed. If the result is "Yes", step 230 is performed. If the result is "No", step 240 is performed. In step 230, both a loop-filtered version of the reconstructed current image unit and a non-loop-filter version of the reconstructed current image unit are allowed to be stored and used as reference data. In step 240, only one version of the reconstructed current image unit is stored as the reference data.

Figure 3:
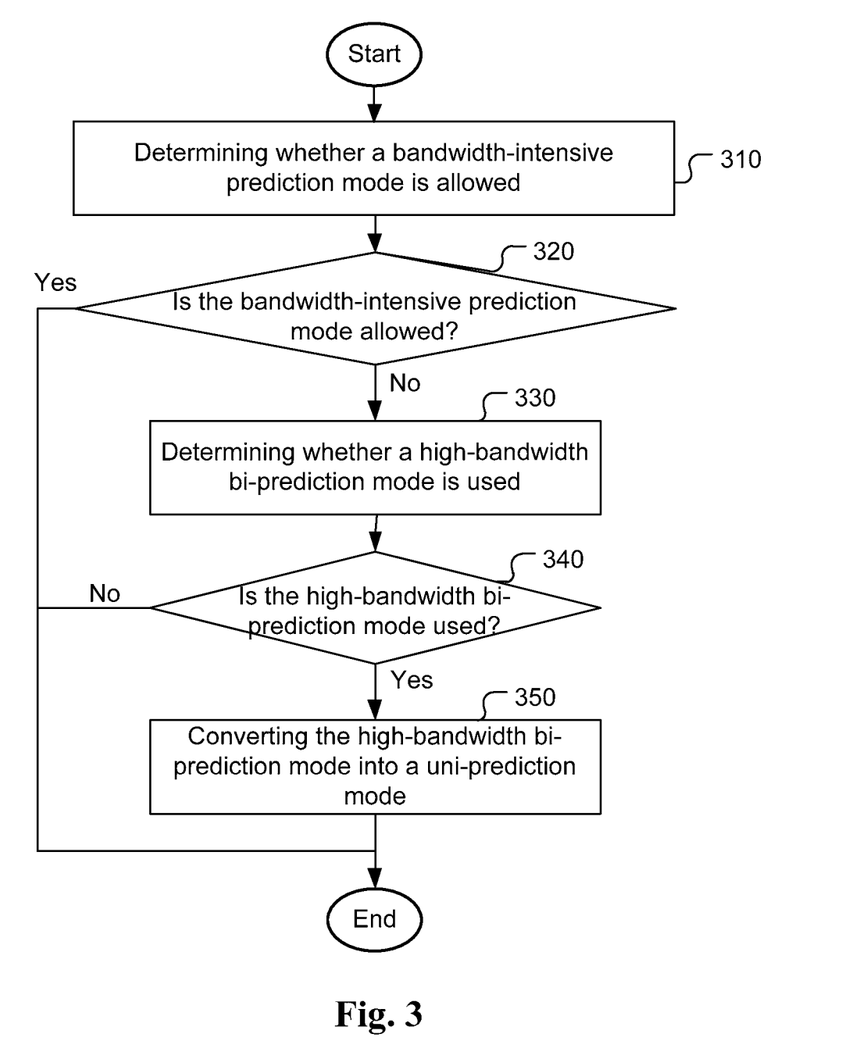
FIG. 3 illustrates a flowchart of another exemplary coding system using coding modes including IntraBC mode (Intra-block copy mode) and Inter prediction mode according to an embodiment of the present invention, where a high-bandwidth bi-prediction mode is converted into a uni-prediction mode to reduce bandwidth.

FIG. 3 illustrates a flowchart of another exemplary coding system using coding modes including IntraBC mode (Intrablock copy mode) and Inter prediction mode according to an embodiment of the present invention, where a high-bandwidth bi-prediction mode is converted into a uni-prediction mode to reduce bandwidth. The system determines whether a bandwidth-intensive prediction mode is allowed as shown in step 310. In one example, the bandwidth-intensive prediction mode is allowed if two versions of a current picture are NOT enabled. In another example, the bandwidth-intensive prediction mode is allowed if motion vectors of a current block have integer value in either horizontal or vertical directions. Whether the bandwidth-intensive prediction mode is allowed is checked in step 320. If the result is "Yes", the process is terminated. If the result is "No", step 330 is performed. In step 330, the system determines whether a high-bandwidth bi-prediction mode is used. Whether a high-bandwidth bi-prediction mode is used is checked in step 340. If the result is "No", the process is terminated. If the result is "Yes", step 350 is performed. In step 350, the high-bandwidth bi-prediction mode is converted into a uni-prediction mode.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding system using coding modes including an Inter prediction mode and an Intra Block Copy (IntraBC) mode, comprising:
   determining a variable to indicate whether two versions of a reconstructed current image unit are needed, wherein determining the variable comprises extracting one or more syntax elements in a picture level, a slice level, or both the picture level and the slice level of a video bitstream;
   if the variable indicates that two versions of the reconstructed current image unit are needed, allowing a loop-filtered version of the reconstructed current image unit and a non-loop-filter version of the reconstructed current image unit to be stored and used as reference data;
   if the variable indicates that two versions of the reconstructed current image unit are not needed, storing only one version of the reconstructed current image unit as the reference data; and
   encoding or decoding according to the stored reference data,
   wherein the variable is determined based on one or more syntax elements in a picture level of a bitstream and wherein said one or more syntax elements are selected from a group of syntax elements comprising a first syntax element indicating whether the IntraBC mode is enabled for a current picture, a second syntax element indicating whether SAO (Sample Adaptive Offset) is enabled, a third syntax element indicating whether deblocking-filter is disabled, and a fourth syntax element indicating whether deblocking-filter-override is enabled.

2. The method of claim 1, wherein the loop-filtered version of the reconstructed current image unit corresponds to deblocking-filtered, SAO-filtered (Sample Adaptive Offset filtered) or both deblocking-filtered and SAO-filtered version of the reconstructed current image unit.

3. The method of claim 1, wherein the reconstructed current image unit corresponds to a reconstructed current picture.

4. The method of claim 1, wherein the variable is determined to allow said two versions of the reconstructed current image unit if the first syntax element indicates that the IntraBC mode is enabled for a current picture and any of three conditions is true, wherein the three conditions correspond to the second syntax element indicates that the SAO is enabled, the third syntax element indicates that the deblocking-filter is disabled, and the fourth syntax element indicates that the deblocking-filter-override is enabled.

5. The method of claim 1, wherein the reconstructed current image unit corresponds to a reconstructed current slice.

6. A method of video coding system using coding modes including an Inter prediction mode and an Intra Block Copy (IntraBC) mode, comprising:
   determining a variable to indicate whether two versions of a reconstructed current image unit are needed, wherein determining the variable comprises extracting one or more syntax elements in a picture level, a slice level, or both the picture level and the slice level of a video bitstream;

if the variable indicates that two versions of the reconstructed current image unit are needed, allowing a loop-filtered version of the reconstructed current image unit and a non-loop-filter version of the reconstructed current image unit to be stored and used as reference data;

if the variable indicates that two versions of the reconstructed current image unit are not needed, storing only one version of the reconstructed current image unit as the reference data; and encoding or decoding according to the stored reference data, wherein the variable is determined based on one or more syntax elements in a picture level, a slice level, or both the picture level and the slice level of a bitstream, and wherein said one or more syntax elements are selected from a group of syntax elements comprising a first syntax element in the picture level of the bitstream indicating whether the IntraBC mode is enabled for a current picture, a second syntax element in the slice level indicating whether luma SAO (Sample Adaptive Offset) is enabled for a current luma slice, a third syntax element in the slice level indicating whether chroma SAO is enabled for a current chroma slice, and a fourth syntax element in the slice level indicating whether deblocking-filter is disabled for a current slice.

7. The method of claim 6, wherein the variable is determined to allow said two versions of the reconstructed current image unit if the first syntax element in the picture level of the bitstream indicates that the IntraBC mode is enabled for the current picture, the second syntax element in the slice level indicates that the luma SAO is enabled for the current luma slice, the third syntax element in the slice level indicates that the chroma SAO is enabled for the current chroma slice, and the fourth syntax element in the slice level indicates that the deblocking-filter is disabled for the current slice.

8. The method of claim 1, further comprising if the variable indicates that two versions of the reconstructed current image unit are needed, converting a high-bandwidth bi-prediction mode into a uni-prediction mode.

9. A method of video coding system using coding modes including an Inter prediction mode and an Intra Block Copy (IntraBC) mode, comprising:

determining a variable to indicate whether two versions of a reconstructed current image unit are needed, wherein determining the variable comprises extracting one or more syntax elements in a picture level, a slice level, or both the picture level and the slice level of a video bitstream;

if the variable indicates that two versions of the reconstructed current image unit are needed, allowing a loop-filtered version of the reconstructed current image unit and a non-loop-filter version of the reconstructed current image unit to be stored and used as reference data;

if the variable indicates that two versions of the reconstructed current image unit are not needed, storing only one version of the reconstructed current image unit as the reference data; and encoding or decoding according to the stored reference data;

comprising if the variable indicates that two versions of the reconstructed current image unit are needed, converting a high-bandwidth bi-prediction mode into a uni-prediction mode;

wherein the high-bandwidth bi-prediction mode corresponds to an 8×8 bi-prediction mode.

10. The method of claim 9, wherein the high-bandwidth bi-prediction mode is converted into the uni-prediction mode by using motion information only from list 0.

11. A video coding system using coding modes including an Inter prediction mode and an Intra Block Copy (IntraBC) mode, comprising one or more electronic circuits arranged to:

determine a variable in a bitstream to indicate whether two versions of a reconstructed current image unit are needed, wherein determining the variable comprises extracting one or more syntax elements in a picture level, a slice level, or both the picture level and the slice level of a video bitstream;

if the syntax element indicates that two versions of the reconstructed current image unit are needed, allow a loop-filtered version of the reconstructed current image unit and a non-loop-filter version of the reconstructed current image unit to be stored and used as reference data;

if the syntax element indicates that two versions of the reconstructed current image unit are not needed, store only one version of the reconstructed current image unit as the reference data; and encode or decode according to the stored reference data, wherein the syntax element is determined based on one or more syntax elements in a picture level of a bitstream and wherein said one or more syntax elements are selected from a group of syntax elements comprising a first syntax element indicating whether the IntraBC mode is enabled for a current picture, a second syntax element indicating whether SAO (Sample Adaptive Offset) is enabled, a third syntax element indicating whether deblocking-filter is disabled, and a fourth syntax element indicating whether deblocking-filter-override is enabled.

\* \* \* \* \*